United States Patent [19]

Suzuki

[11] Patent Number: 5,353,752
[45] Date of Patent: Oct. 11, 1994

[54] INTAKE SYSTEM FOR INTERNAL COMBUSTION ENGINE

[75] Inventor: Makoto Suzuki, Mishima, Japan

[73] Assignee: Toyota Jidosha Kabushiki Kaisha, Toyota, Japan

[21] Appl. No.: 113,160

[22] Filed: Aug. 27, 1993

[30] Foreign Application Priority Data

Aug. 31, 1992 [JP] Japan ............... 4-231890

[51] Int. Cl.⁵ .................................. F02B 75/18
[52] U.S. Cl. .................................. 123/184.61
[58] Field of Search ............... 123/52 M, 52 MV

[56] References Cited

FOREIGN PATENT DOCUMENTS 59-49760  4/1984  Japan .
61-3952   1/1986  Japan .
63-38354  10/1988 Japan .
2-153252  12/1990 Japan .

Primary Examiner—Noah P. Kamen
Attorney, Agent, or Firm—Kenyon & Kenyon

[57] ABSTRACT

An intake system for an internal combustion engine comprising an intake passage and an exhaust gas recirculation system merging into the intake passage. The intake passage upstream of the merging point of the exhaust gas recirculation system only is made with an increased heat-insulating ability. Whereby, in the case that the exhaust gas is recirculated, intake air remains at a low temperature without being heated by the atmosphere in the engine compartment until the intake air reaches the merging point, and thereafter, the intake air mixing with the very hot exhaust gas is supplied to the combustion chamber as heat is released therefrom because the intake passage downstream of the merging point is not made with an increased heatinsulating ability.

12 Claims, 2 Drawing Sheets

INTAKE SYSTEM FOR INTERNAL COMBUSTION ENGINE

BACKGROUND OF THE INVENTION

1. Field of the Invention

The present invention relates to an intake system for an internal combustion engine having an exhaust gas recirculation system.

2. Description of the Related Art

The temperature in a vehicle engine compartment becomes relative high due to the heat released from an internal combustion engine therein, so that an intake passage in the engine compartment is heated and the temperature of intake air supplied to the combustion chamber becomes relative high. This reduces the charging efficiency and the engine power drops. In particular, when in a high-load driving condition, engine knock (pre-ignition) is apt to occur. To solve these problems, Japanese Unexamined Patent Publication No. 2-153252 discloses an intake passage entirely surrounded by a heat insulator. It is also known that the intake passage can be made of any material having a high heat-insulating ability. These related arts can prevent the intake passage from being heated by the atmosphere in the engine compartment.

In the case where the intake system has an exhaust gas recirculation system, by which a part of exhaust gas is recirculated via the intake passage to the combustion chamber, and the main components of the exhaust gas are inert gases having a high heat capacity, the combustion temperature is reduced by the inert gases and an amount of nitrogen oxides generated by combustion can be decreased. When such exhaust gas recirculation is carried out, the above intake passages, with increased heat-insulating ability cause the temperature of the intake air supplied to the combustion chamber to be increased, in contrast to the normal intake passages. This is because the exhaust gas is very hot so that the temperature of the intake air becomes higher than the atmosphere in the engine compartment when the exhaust gas is mixed therewith, and thereafter, in the normal intake passage where heat should be released from the intake air, the heat is not released via the above intake passage. Moreover, the above intake passage is heated by the intake air mixed with the exhaust gas and remains at a high temperature immediately after the exhaust gas recirculation is stopped, so that high-temperature intake air is also supplied to the combustion chamber at this time. The above problems occur in the case that the exhaust gas recirculation system is connected to the above intake passage.

SUMMARY OF THE INVENTION

Therefore, an object of the present invention is to provide an intake system for an internal combustion engine, which system has an exhaust gas recirculation system and can supply relatively low temperature intake air to the combustion chamber when the exhaust gas recirculation is being carried out and immediately after it has been stopped.

According to the present invention there is provided an intake system for an internal combustion engine comprising an intake passage and an exhaust gas recirculation system merging into the intake passage, wherein only the intake passage upstream of the merging point of the exhaust gas recirculation system has an increased heat-insulating ability.

The present invention will be more fully understood from the description of the preferred embodiments of the invention set forth below, together with the accompanying drawings.

DESCRIPTION OF THE PREFERRED EMBODIMENTS

Figure 1:
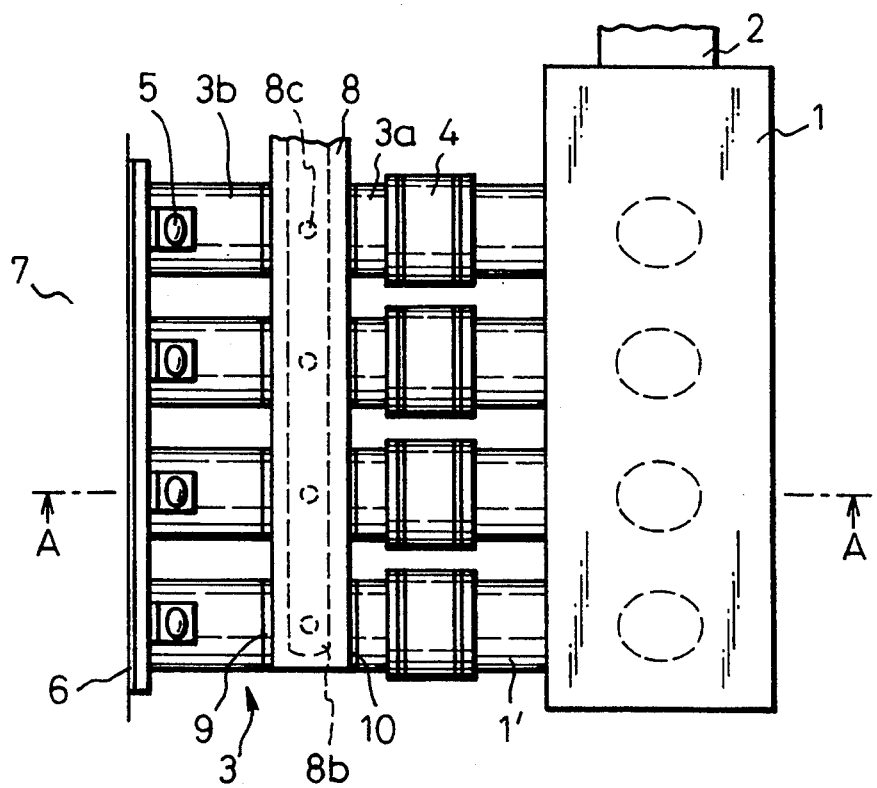
FIG. 1 is a plan view of an intake system as a first embodiment of the present invention.
Figure 2:
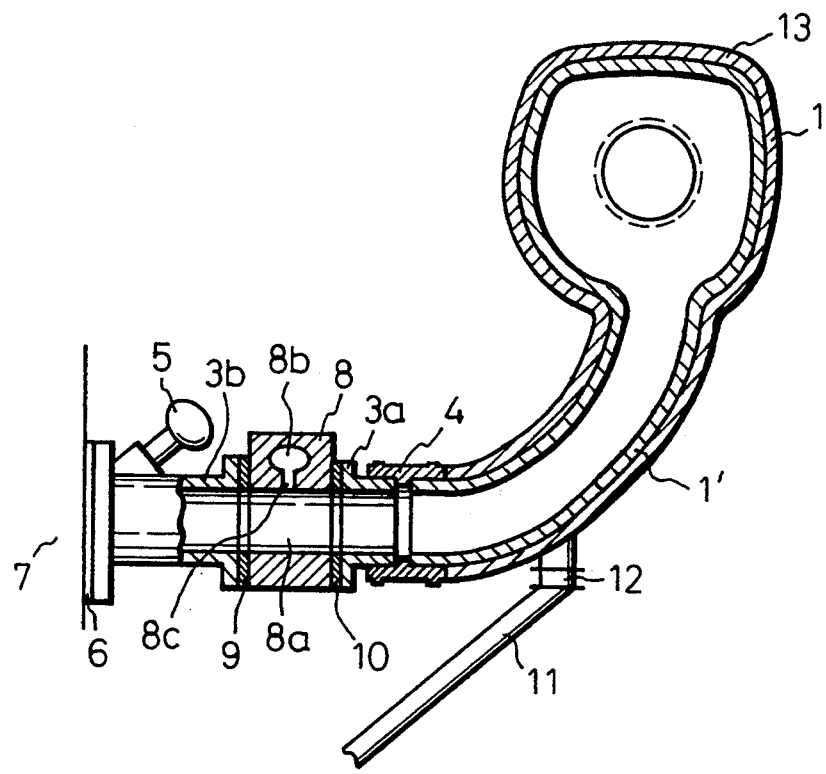
FIG. 2 is an A—A sectional view of FIG. 1.

FIG. 1 shows a first embodiment of an intake system according to the present invention. By way of one example, the intake system is for a four-cylinder internal combustion engine. In this figure, reference numeral 1 designates a surge tank. An intake pipe 2 is connected to the upstream side of the surge tank and a throttle valve (not shown) is arranged therein. The intake pipe 2 eventually leads to an air cleaner (not shown). FIG. 2 shows an A—A sectional view of FIG. 1. As shown in FIG. 1 and FIG. 2, four branch pipes 1' for the four cylinders project from the downstream side of the surge tank 1.

An intake manifold 3 for the above engine is divided into upstream and downstream portions 3a, 3b. The upstream portion 3a is connected to the branch pipes 1' via four rubber pipes 4 for vibration-proofing. On the other hand, the downstream portion 3b is arranged with four injectors 5 for injecting fuel to the each cylinder, respectively, and is connected to a cylinder block 7 via a gaskets 6.

A block 8 for exhaust gas recirculation is inserted between the upstream and downstream portions 3a, 3b and is fixed to them via gaskets 9 and 10. The block 8 has four channels 8a to communicate the upstream portion 3a with the downstream portion 3b. The channels 8a have same inside diameter as the intake manifold 3, respectively. The block 8 also has an exhaust gas passage 8b which passes above the each channel 8a. Each channel 8a and the exhaust gas passage 8b communicate with each other by four communicating holes 8c. One end of the exhaust gas passage 8b is terminated in the block 8 and the other end is connected to the exhaust side of the engine via an exhaust-gas-amount-control valve (not shown).

The each branch pipe 1' is supported by a supporting member 11 which extends from the cylinder block 7, via rubber members 12 for vibration-proofing. Accordingly, the surge tank 1 and the branch pipes 1' are supported on the cylinder block 7 and are isolated from transmitted engine vibration by the rubber pipes 4 and the rubber members 12, so that stress is not generated on the root of the branch pipes 1' and the like, and noise caused by surge tank vibration is reduced considerably.

The intake passage consists of the intake pipe 2, the surge tank 1 with the branch pipes 1', the intake manifold 3, and the channels 8a in the block 7. The intake pipe 2, the surge tank 1, and the branch pipes 1' positioned in the upstream side of the intake passage from merging point (channels 8a) of the exhaust gas recirculation system are covered with heat insulating layer 13 such as synthetic resins. On the other hand, such heat insulating layer 13 is not formed around the intake manifold 3 and the block 8 for exhaust gas recirculation.

By such an intake system, once the exhaust gas recirculation is carried out in an intake stroke, intake air taken from the air cleaner passes through the intake pipe 2 and the surge tank 1 and the branch pipes 1' and reaches the upstream portion 3a of the intake manifold 3, and until this time, the intake air is riot heated from the atmosphere of the engine compartment by the heat insulating layer 3 so that it remains at a relative low temperature. Thereafter, the intake air is heated to a higher temperature than the atmosphere of the engine compartment by mixing with the very hot exhaust gas flowing into the intake manifold 3 from the block 8. However, the intake air is supplied to the combustion chamber as heat is taken therefrom via the intake manifold 3, because the heat insulating layer 3 is not formed around it. Whereby the temperature of the intake air is reduced and thus the charging efficiency is not decreased and the engine power does not drop. Moreover, the intake air remains at a relatively low temperature before mixing with the exhaust gas so that the temperature rise of the intake air thereafter can be minimized, and the heat transfer is carried out via the intake manifold 3 so that the temperature rise of the intake manifold 3 can be minimized and thus the intake air is not heated by the intake manifold 3 immediately after exhaust gas recirculation has been stopped.

If heat is transmitted from the intake manifold 3 to the branch pipes 1', they remain at a relative high temperature due to the heat insulating layer 13, whereby the intake air is heated. However, in this embodiment, the rubber pipes 4 function not only as the above vibration-proofing members, but also as the heat insulating members, and they prevent heat transmission to the branch pipes 1'.

Such exhaust gas recirculation is effective in reducing nitrogen oxides in the exhaust gas, but it causes some deterioration in combustion, and it is not always carried out, except in high-engine-load driving conditions requiring high engine torque and in low-engine-load driving conditions in which combustion is unstable.

In the normal exhaust-gas-recirculation system, the exhaust-gas passage thereof merges into the intake passage upstream of the surge tank. However in this embodiment, the exhaust gas passage 8b merges into the intake manifold 3 at a point relatively close to the combustion chamber and the intake passage upstream of the merging point is provided with a heat insulating layer 13 so that almost of the intake passage is covered with the heat insulating layer 13. Accordingly, in the case that the exhaust gas recirculation is stopped, the intake air is heated by the atmosphere in the engine compartment only via a small portion of the intake passage, whereby the temperature of the intake air supplied to the combustion chamber rises only a little.

Figure 3:
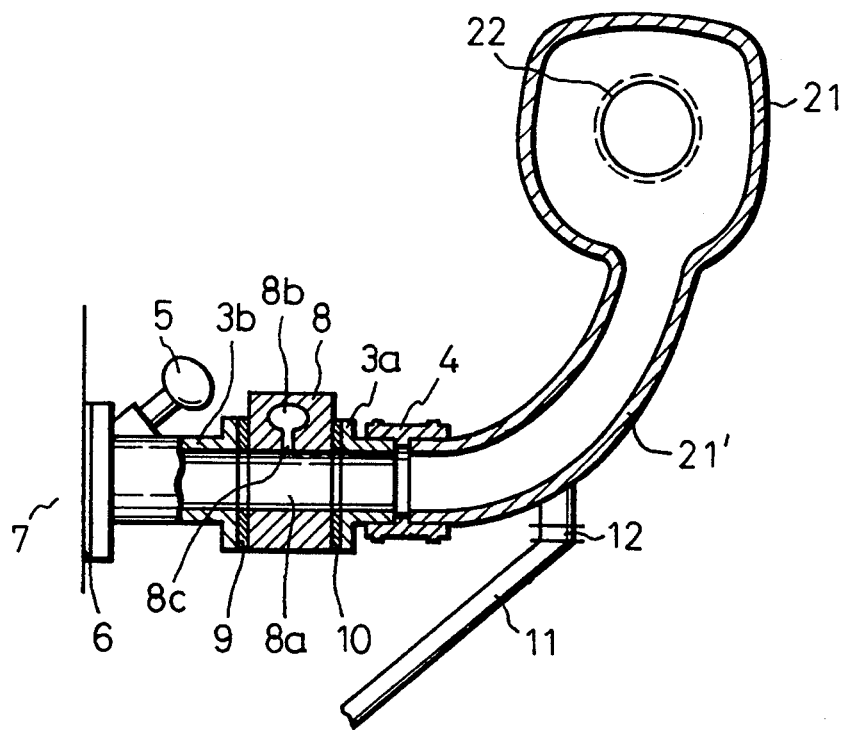
FIG. 3 is a similar sectional view of an intake system to FIG. 2, as a second embodiment of the present invention.

Moreover, in this embodiment, the block 8 for exhaust gas recirculation also functions to increase the rigidity of the intake manifold 3. ]0 FIG. 3 shows a sectional view of an intake system similar to FIG. 2 as an second embodiment according to the present invention. In the second embodiment, an intake pipe 22 and a surge tank 21 and branch pipes 21' are made of any material having a high heat-insulating ability such as ceramic. This is the only the difference between the first and second embodiments. Accordingly, even if the heat insulating layer is omitted, the second embodiment can obtain the same effects as the first embodiment.

The exhaust gas passage 8b may merge into the intake passage upstream of the surge tank 1, 21 as in the normal exhaust gas recirculation system and the intake pipe 2, 22 upstream of the merging point of the exhaust gas recirculation system only is made with increased the heat-insulating ability. In this case, the heat is released from the intake air after mixing with the exhaust gas so that lower-temperature intake air can be supplied to the combustion chamber, in contrast to the related arts.

Although the invention has been described with reference to specific embodiments thereof, it should be apparent that numerous modifications can be made thereto by those skilled in the art, without departing from the basic concept and scope of the invention.

I claim:

1. An intake system for an internal combustion engine comprising an intake passage which extends from an upstream end to a downstream end which is coupled to the engine and an exhaust gas recirculation passage which merges into said intake passage at a merging point, wherein the portion of said intake passage upstream of the merging point has a substantially increased thermal insulation relative to the portion of the intake passage downstream of the merging point.

2. An intake system according to claim 1, wherein a heat insulating layer is arranged around said intake passage upstream of said merging point.

3. An intake system according to claim 2, wherein said heat insulating layer is made of a synthetic resin.

4. An intake system according to claim 1, wherein said intake passage upstream of said merging point is made of a material having a high heatinsulating ability.

5. An intake system according to claim 4, wherein said material is ceramic.

6. An intake system according to claim 1, wherein said exhaust gas recirculation system merges to said intake passage at a point close to said engine.

7. An intake system according to claim 6, wherein said intake passage has a surge tank and an intake manifold downstream of said surge tank, and wherein said exhaust gas recirculation passage merges into said intake manifold by means of a block, said block interconnecting each pipe of said intake manifold.

8. An intake system according to claim 1, wherein said intake passage is divided into an upstream portion and a downstream portion, the upstream portion extending from the upstream end to a point immediately upstream of said merging point and having an increased heat-insulating ability relative to the downstream portion, and wherein said upstream portion is connected to the downstream portion by at least one elastic member.

9. An intake system according to claim 8, wherein said elastic member is a rubber pipe.

10. An intake system according to claim 8, wherein said intake passage has a surge tank and said intake passage is divided downstream of said surge tank.

11. An intake system according to claim 8, wherein said surge tank is supported on said engine via at least one elastic member.

12. An intake system according to claim 11, wherein said elastic member is rubber member.

* * * * *